Sept. 25, 1923.
E. A. STALLINGS
ELECTROLYTE GAS AND SPLASH ESCAPE
Filed Nov. 22, 1921
1,469,119
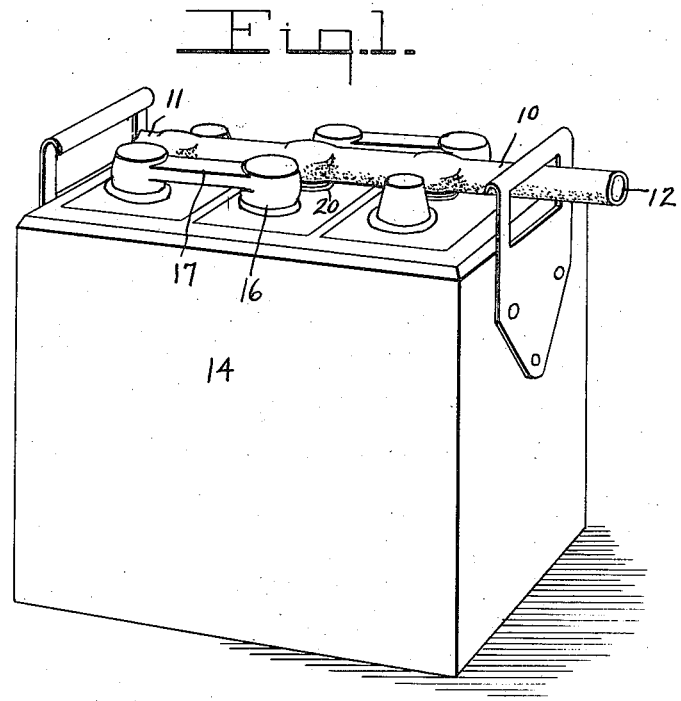
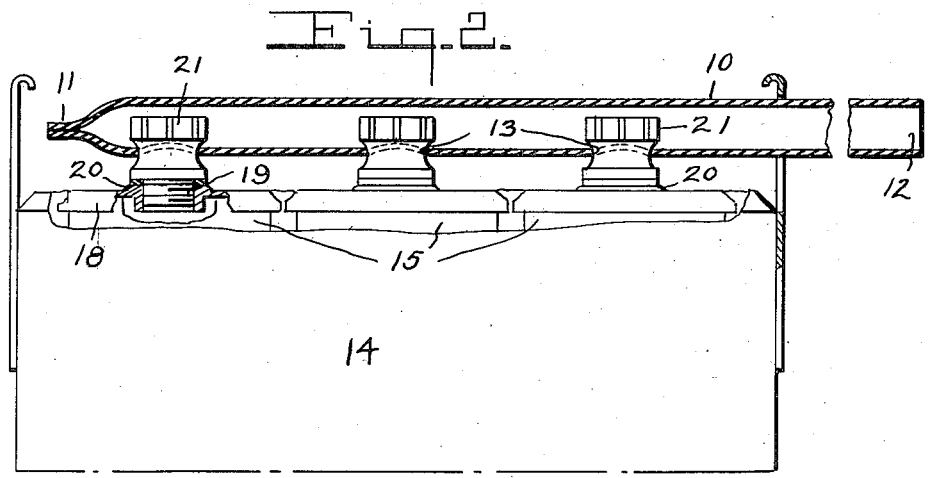
Inventor
E. A. Stallings
By
Attorney Patented Sept. 25, 1923.

1,469,119

UNITED STATES PATENT OFFICE.

EUGENE A. STALLINGS, OF WIRT, OKLAHOMA.

ELECTROLYTE GAS AND SPLASH ESCAPE.

Application filed November 22, 1921. Serial No. 517,131.

*To all whom it may concern:*

Be it known that I, EUGENE A. STALLINGS, a citizen of the United States, residing at Wirt, in the county of Carter and State of Oklahoma, have invented certain new and useful Improvements in Electrolyte Gas and Splash Escapes; and I do hereby declare the following to be a full, clear, and exact description of the invention, such as will enable others skilled in the art to which it appertains to make and use the same.

This invention relates to an electrolyte gas and splash escape means for storage battery or secondary cells and other electrochemical apparatus.

A particular aim is to provide a novel means whereby the escaping electrolyte gas or splashing electrolyte in an article of the type mentioned may be received and drained without contact with or harmful effect on adjacent structure.

As well, I aim to provide in the case of a vehicle-equipped storage battery, means whereby the fumes or gases or splashed electrolyte cannot reach the exterior of the cell covers and accordingly the pillar posts of the electrodes through the filling openings to result in corrosion at said posts, so that the electrolyte cannot bridge pillar posts of opposite polarity to result in the collection of dust and consequent bridging or short circuiting thereof, and further so that the same cannot reach the wooden box usually containing the cells and thus avoid premature rotting thereof under the influence of the electrolyte.

Another object is to provide the invention in the form of a conduit having one or more openings to receive filling and vent means of a storage battery cell or cells and which is dilatible about said openings so as to form a seal in addition to permitting passage over and attachment to said means.

Additional objects and advantages will become apparent from a description of the invention following hereinafter and to be considered in connection with accompanying drawings illustrating one practical embodiment.

In said drawings:—

Figure 1 is a perspective view of a storage battery equipped with my improvement; and Figure 2 is a longitudinal sectional view through the improved article and covers of the battery cells with the former in place thereon.

Like reference characters designate like or similar parts in both views.

In reducing the invention to practice, a tube is provided at 10 closed at one end 11 and open at the opposite end as at 12 to provide a drain or escape opening. Intermediate its ends, and in longitudinal alinement, one or more attaching openings 13 are provided. Said tube may be made of any suitable material in order that the same at the openings 13 may be dilated, and to this end, is preferably of an elastic material such as rubber, reenforced rubber, or a rubber composition.

Particular attention is called to the fact that such tube may be made in a single piece.

To facilitate an understanding of the use of the invention, a storage battery has been conventionally shown consisting of the usual wooden box 14 containing a plurality of cells 15 through the covers of which pillar posts 16 project for connection of straps 17 and of leads or cables to the exposed posts 16. This example of a storage battery is the type usually employed in an automobile for starting, lighting and ignition, or either. Said cells have the usual covers thereon at 18 and are provided with filling openings 19 for electrolyte and which openings have annular rims or flanges rising therefrom at 20 of greater diameter than openings 19 and normally closed by removable vent plugs or caps 21.

In the application of my invention, the tube 10 is so disposed that the openings 18 receive the vent plugs or caps 21, dilating the tube about said cap in order that the tube at said openings 13 will contract about the caps 21 and thus form a seal to prevent escape of splashing electrolyte or electrolyte gas from the tube onto the covers 18 to thus avoid the well known injurious results such as those outlined in my hereinbefore specified objects.

Attention is directed to the fact that the contents of the tube 10 can only escape through the discharge end 12 inasmuch as the other end at 11 is closed and it is also to be noted that the tube 10 projects a distance beyond one end or side of the battery so as to discharge its contents at a suitable location out of contact with surrounding structure.

As will be realized the invention may be reduced to practice in various sizes and shapes according to conditions and that it forms such an attachment as does not require any change whatever in the construction or arrangement of the battery or other electrochemical apparatus to accommodate its use.

The electrolyte which is usually sulphuric acid will not injure the conduit 10, since it is of rubber.

It is to be understood that merely one practical embodiment has been illustrated and described in view of which fact changes may be made therein.

I claim as my invention:—

An electrolyte gas and splash escape means for secondary batteries consisting of a single length of elastic tubing of substantially the same diameter throughout closed at one end and open at the other end, said tube at the latter end being adapted to extend beyond the body for communication with the atmosphere and constant discharge of its contents, and the tube having a plurality of openings through its wall adapted for dilation to receive and have sealing contact with the vent means of the cells of the battery.

In testimony whereof I affix my signature in presence of two witnesses.

EUGENE A. STALLINGS.

Witnesses:
A. L. OLIPHANT,
G. W. SMITH.